(12) United States Patent
Choi et al.

(10) Patent No.: US 9,499,689 B2
(45) Date of Patent: Nov. 22, 2016

(54) CARBON FIBER REINFORCED POLYPROPYLENE RESIN COMPOSITION WITH EXCELLENT MOLDING PROPERTY

(71) Applicants: Hyundai Motor Company, Seoul (KR); Lotte Chemical Corporation, Seoul (KR)

(72) Inventors: Chi Hoon Choi, Gyeonggi-do (KR); Young Ho Choi, Gyeonggo-go (KR); Gi Hwan Kim, Gyeonggi-do (KR); Jeong Min Cho, Gyeonggi-do (KR); Eun Hwa Jang, Daejeon (KR); Seong Min Cho, Daejeon (KR); Chang Hyoo Choi, Daejeon (KR)

(73) Assignees: Hyundai Motor Company, Seoul (KR); Lotte Chemical Corporation, Seoul (KR)

( * ) Notice: Subject to any disclaimer, the term of this patent is extended or adjusted under 35 U.S.C. 154(b) by 0 days.

(21) Appl. No.: 14/479,872

(22) Filed: Sep. 8, 2014

(65) Prior Publication Data

US 2015/0166742 A1 Jun. 18, 2015

(30) Foreign Application Priority Data

Dec. 17, 2013 (KR) .................. 10-2013-0157328

(51) Int. Cl.
*C08K 3/04* (2006.01)
*C08L 23/12* (2006.01)
*C08J 3/20* (2006.01)

(52) U.S. Cl.
CPC .............. *C08L 23/12* (2013.01); *C08J 3/203* (2013.01); *C08J 2323/12* (2013.01); *C08J 2323/16* (2013.01); *C08J 2423/26* (2013.01); *C08J 2451/06* (2013.01)

(58) Field of Classification Search
CPC .. C08J 5/042; C08J 2323/12; C08J 2451/06; C08L 23/12; C08L 23/16

USPC ....................................................... 524/495
See application file for complete search history.

(56) References Cited

U.S. PATENT DOCUMENTS

| 4,395,362 A | 7/1983 | Satoh et al. |
| 4,469,138 A | 9/1984 | Satoh |

FOREIGN PATENT DOCUMENTS

| JP | 11-181181 A | | 7/1999 |
| JP | 11181181 A | * | 7/1999 |
| JP | 2005-213478 A | | 8/2005 |
| JP | 2006225467 A | * | 8/2006 |
| JP | 2006-272773 A | | 10/2006 |
| JP | 2009-114435 A | | 5/2009 |
| JP | 2011-063029 A | | 3/2011 |
| KR | 10-2001-0112733 A | | 12/2001 |
| KR | 10-2004-0008806 A | | 1/2004 |
| KR | 2008-0061077 A | | 7/2008 |
| KR | 2010-0105028 A | | 9/2010 |
| KR | 2011-0108976 A | | 10/2011 |
| KR | 10-1317596 B1 | | 10/2013 |

OTHER PUBLICATIONS

Translation of JP 2006-225467, Aug. 31, 2006.*
Translation of JP 11-181181, Jul. 6, 1999.*

* cited by examiner

*Primary Examiner* — Hui Chin
(74) *Attorney, Agent, or Firm* — Mintz Levin Cohn Ferris Glovsky and Popeo, P.C.; Peter F. Corless

(57) ABSTRACT

The present invention provides a carbon fiber reinforced polypropylene resin composition with improved molding property. In particular, provided is a carbon fiber reinforced polypropylene resin composition with significantly improved molding property, tensile strength, flexural strength and the like by adding a modified polypropylene grafted with maleic anhydride as a compatibilizer to a polypropylene resin to reinforce the carbon fiber.

8 Claims, 3 Drawing Sheets

(a)

(b)

CARBON FIBER REINFORCED POLYPROPYLENE RESIN COMPOSITION WITH EXCELLENT MOLDING PROPERTY

CROSS-REFERENCE TO RELATED APPLICATION

This application claims under 35 U.S.C. §119(a) the benefit of Korean Patent Application No. 10-2013-0157328 filed on Dec. 17, 2013, the entire contents of which are incorporated herein by reference.

TECHNICAL FIELD

The present invention relates to a carbon fiber reinforced polypropylene resin composition which has improved molding property. Particularly, a carbon fiber reinforced polypropylene resin composition with remarkably improved molding property, tensile strength, flexural strength and the like may be prepared by adding a modified polypropylene grafted with maleic anhydride as a compatibilizer to a polypropylene resin to reinforce the carbon fiber.

BACKGROUND

In general, a resin composition including polypropylene as a base resin has been widely used for various engineered plastic applications.

In order to reinforce physical properties of the polypropylene resin composition, a fiber reinforced composite has been prepared by mixing reinforcing fiber and the like with the resin composition and the composite has been used in the related art. Since such a resin composite of fiber reinforced polypropylene has improved physical properties, such as rigidity and heat resistance, compared to typical engineered plastics, the resin composite has been used as a functional engineered plastic widely in various industrial fields, in particular, in the automobile field, the electricity industrial field, and the like. However, problems still remain in other physical properties, and therefore, improvements have been continuously made.

In the related arts, a forming method and a forming apparatus of long-fiber reinforced thermoplastic resins has been introduced. For example, composite materials including glass fiber has been introduced.

Currently, the fiber reinforced polypropylene resin compositions may be one of the most widely used resins with enhanced rigidity or heat resistance by filling a polypropylene resin with reinforcing fiber, such as glass fiber or carbon fiber. From among these, in order to improve compatibility of a polypropylene resin with reinforcing fiber, required physical properties such as rigidity and heat resistance have been improved by adding a modified polyolefin which may be prepared by grafting maleic acid and the like with polypropylene to the polypropylene resin to increase compatibility with reinforcing fiber. As an example, a composition including an acid-modified polypropylene produced by adding polypropylene and maleic acid, and carbon fiber has been developed; and a resin composition including 100 parts by weight of polypropylene, 10 to 50 parts by weight of maleic acid-modified polypropylene, 5 to 65 parts by weight of carbon fiber, and 5 to 65 parts by weight of electroconductive carbon black has been reported. Further, a resin composition including 100 parts by weight of polypropylene, 0.5 to 20 parts by weight of a maleic anhydride modified polypropylene resin, carbon fiber or carbon black, glass fiber, and an inorganic filler has been suggested.

Although above-mentioned polypropylene compositions may have excellent rigidity and thermal resistance, they may not be used for parts which have to withstand external impact due to their low tensile and flexural strength. Accordingly, aforementioned conventional polypropylene compositions may have poor impact energy absorbing ability, and break when they are used for vehicle molded products, for example, bumpers, external, and other internal parts.

Some attempts have been made to improve physical properties, for example, by adding rubber components or using a particular polypropylene. However, due to the particular polypropylene, improvement in tensile strength or impact absorbing ability, and the like may not be sufficient as compared to improved other physical properties such as rigidity, and accordingly, a problem of producing defective products has not been solved.

In other examples, a particular use of a propylene monomer having an isotactic index of 87 to 92 wt % (NMR reference standards) and a melt index of 0.5 to 35 g/10 min (230° C.) as a polypropylene base resin while a rubber elastomer is applied has been developed, but the composition also fails to solve a problem in that tensile strength or flexural strength, and the like are poor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present inventors may provide a technical solution to above-described problems in the related art. In particular, when a polypropylene resin having a specific physical property is used as a base material; maleic anhydride modified polypropylene is melt kneaded with a compatibilizer, and carbon fiber is impregnated, a propylene resin composition may have improved physical properties, such as molding property, tensile strength, flexural strength and the like.

In one aspect, the present invention provides a polypropylene resin composition of which molding property and physical properties such as tensile strength and flexural strength may be improved. In particular, a carbon fiber reinforced polypropylene resin composition having improved molding property, in which carbon fiber may be impregnated in polypropylene, is provided. In addition, the present invention provides a carbon fiber reinforced polypropylene resin composite having improved carbon fiber distribution and mechanical properties due to a thermoplastic resin penetrating carbon fiber.

In another aspect, the present invention further provides a molded product manufactured by performing molding with the carbon fiber reinforced polypropylene resin composition with improved molding property.

In an exemplary embodiment, a polypropylene resin composition may include: an amount of about 50 to about 80 wt % of a polypropylene resin having a melt index (MI) of about 20 to about 100 g/10 min at a temperature of about 230° C., a molecular weight distribution (MWD) of about 5 to about 10 and an isotactic index of about 97 to about 100 as a homopolymer of propylene or a propylene-ethylene copolymer; an amount of about 1 to about 10 wt % of a modified polypropylene having a maleic anhydride graft ratio of about 0.5 to about 15 wt % as a compatibilizer, and 15 to 40 wt % of carbon fiber.

It is understood that weight percents of the resin composition as disclosed herein are based on total weight of the resin composition, unless otherwise indicated.

In an exemplary embodiment, a carbon fiber reinforced polypropylene resin composite may be prepared by impregnating an amount of about 15 to about 40 wt % of carbon fiber in a melt mixture including an amount of about 50 to about 80 wt %/o of a polypropylene resin as a homopolymer of propylene or a propylene-ethylene copolymer and an amount of about 1 to about 10 wt % of a modified polypropylene as a compatibilizer. Particularly, the polypropylene resin may have a melt index (MI) of about 20 to about 100 g/10 min at a temperature of about 230° C., a molecular weight distribution (MWD) of about 5 to about 10 and an isotactic index of about 97 to about 100. Further, the modified polypropylene may have a maleic anhydride graft ratio of about 0.5 to about 15 wt %.

In an exemplary embodiment, the present invention further provides a molded product manufactured by performing molding with the polypropylene resin composition.

The carbon fiber reinforced polypropylene resin composition according to various exemplary embodiments of the present invention may be used variously as engineered plastics since the resin composition may have improved rigidity or various mechanical strengths and may also have low melt viscosity and improved molding property, elastic modulus and the like. Particularly, significantly improved physical properties such as tensile strength and flexural strength may be obtained by using above-described propylene resin and modified polypropylene grafted with maleic anhydride as a compatibilizer.

In addition, since the propylene resin may have improved strength and fluidity, and may penetrate easily into the bundles of carbon fiber during the process of preparing a carbon fiber composite, an additional effect of enhancing physical properties due to improvement in the dispersibility may be obtained. Furthermore, when parts are molded via an injection or extrusion molding process, workability may be improved and also cycle time may be reduced, thereby enhancing the quality of external appearances.

Accordingly, when the propylene resin is applied to various industrial products, or particularly when the PP resin is applied to parts for a vehicle, physical properties may be improved significantly.

Further, the technology provided in the present invention may reduce material costs since desired strength may be obtained at a relatively low content of carbon fiber and a small amount of expensive carbon fiber materials.

Other aspects and various exemplary embodiments of the invention are discussed infra.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus do not limit the scope of the present invention, and wherein:

FIG. 3 (a) is the microscopic view of a broken-out section of a polypropylene resin composition prepared in Comparative Example 2; and FIG. 3 (b) is the microscopic view of broken-out section in Example 2 according to an exemplary embodiment of the present invention. The microscopic views were captured by a scanning electron microscope (SEM).

Figure 1:
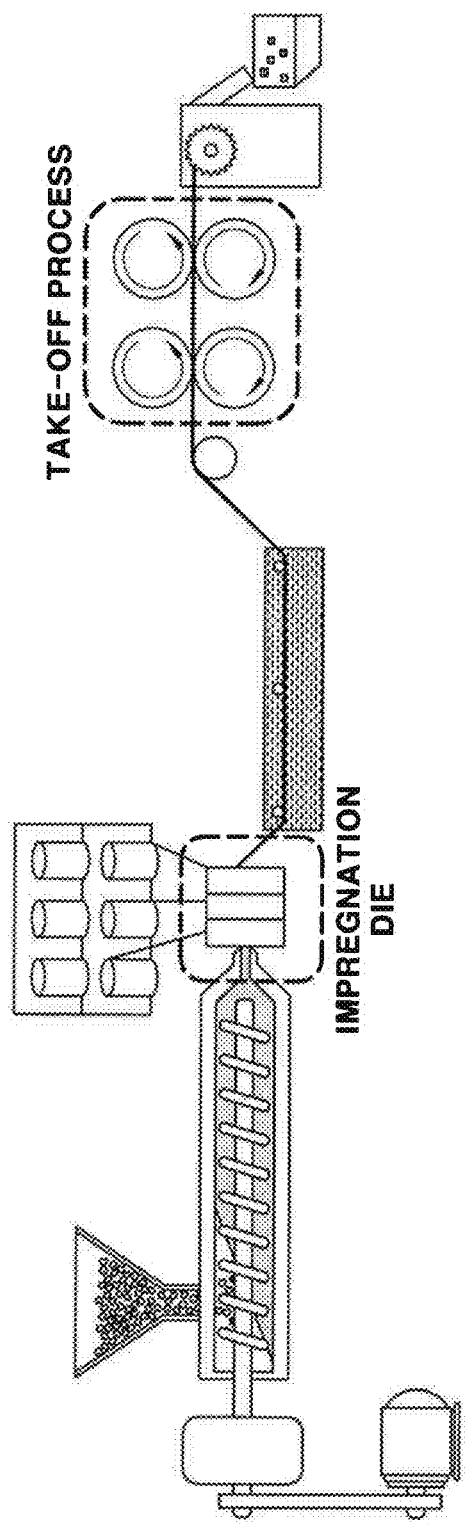
FIG. 1 is a schematic view illustrating an exemplary process for impregnating reinforcing fiber in a resin according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention may provide a polypropylene resin composition having significantly improved physical properties. The polypropylene resin may be prepared by using a polypropylene resin and using carbon fiber while a modified polypropylene resin grafted with maleic anhydride is added thereto.

In an exemplary embodiment of the present invention, the propylene resin may be as a homopolymer of propylene or a propylene-ethylene copolymer and may have a melt index (MI) of about 20 to about 100 g/10 min at a temperature of about 230° C., a molecular weight distribution (MWD) of about 5 to about 10, and an isotactic index of about 97 to about 100. When the melt index is less than the predetermined amount, for instance, less than about 20 g/10 min, molding property may be insufficient due to deterioration of resin flowability; and when the melt index is greater than the predetermined amount, for instance, greater than about 100 g/10 min, impact resistance or heat resistance may deteriorate. In addition, when the molecular weight distribution is less than about 5, processability may deteriorate; and when the molecular weight distribution is more than about 10, strength may decrease. Particularly, the isotactic index may be in the range of about 97 to about 100 for optimization of molding property and mechanical properties of the carbon fiber composite.

In an exemplary embodiment of the present invention, due to the properties of the polypropylene resin as described above, adding a compatibilizer with carbon fiber may improve compatibility. For example, not only a molding property but also tensile strength and flexural strength and the like may be improved while other physical properties may be improved in contrast to conventional polypropylene resins.

In an exemplary embodiment of the present invention, the polypropylene resin is used in an amount of about 50 to about 80 wt %, or particularly of about 60 to about 70 wt %. When the amount of the polypropylene is greater than the predetermined amount, for instance, greater than about 80 wt %, various physical properties may deteriorate; and when the amount is less than the predetermined amount, for instance, less than about 50 wt %, molding property may deteriorate.

In an exemplary embodiment of the present invention, for improving compatibility of the polypropylene resin with carbon fiber and the like along with reinforcement of physical properties caused by using the polypropylene resin and carbon fiber, modified polypropylene having a maleic anhydride graft ratio of 0.5 to 15 wt % may be used as a compatibilizer. When the graft ratio of maleic anhydride in the modified polypropylene used is less than the predetermined amount, for instance, less than about 0.5 wt %, physical property may not be improved and the impregnation property of the composite may deteriorate; and when the graft ratio is greater than the predetermined amount, for instance, greater than about 15 wt %, various physical properties may deteriorate. In an exemplary embodiment, the modified polypropylene is used in an amount of about 1 to about 10 wt %, or particularly of about 2 to about 7 wt %. When the amount thereof is less than the predetermined amount, for instance, less than about 1 wt %, impregnating property deteriorates, and when the modified polypropylene is used in significantly greater than the predetermined amount, for instance, greater than about 10 wt %, deterioration of physical properties may occur.

In an exemplary embodiment, carbon fiber may be used as a reinforcing fiber for reinforcement of physical properties. The carbon fiber may be included in an amount of about 15 to about 40 wt %, or particularly of about 25 to about 35 wt %. When the use amount of the carbon fiber is less than the predetermined amount, for instance, less than about 15 wt %, mechanical properties and heat resistance may deteriorate; and when carbon fiber is used significantly greater than the predetermined amount, for instance, greater than about 40 wt %, deterioration in molding property due to deterioration of flowability and deterioration in dispersibility due to an increase in amount of fiber may occur.

In an exemplary embodiment, one or more of additives may be added to the polypropylene resin composition. The additive may be, but not limited to, as an antioxidant, a heat stabilizer, a process aid and a UV stabilizer and may be added in a small amount in addition to the components.

The polypropylene resin composition according to an exemplary embodiment of the present invention may be used as a composite. Particularly a carbon fiber reinforced polypropylene resin composite may be prepared by impregnating an amount of about 15 to about 40 wt % of carbon fiber in a melt mixture obtained by melting an amount of about 50 to about 80 wt % of the polypropylene resin and an amount of about 1 to about 10 wt %/o of the modified polypropylene as a compatibilizer. Accordingly, the present invention provides a carbon fiber reinforced polypropylene resin composite composed of the polypropylene resin composition.

In addition, a method of preparing a composite with carbon fiber by using the polypropylene resin composition is provided.

Figure 2:
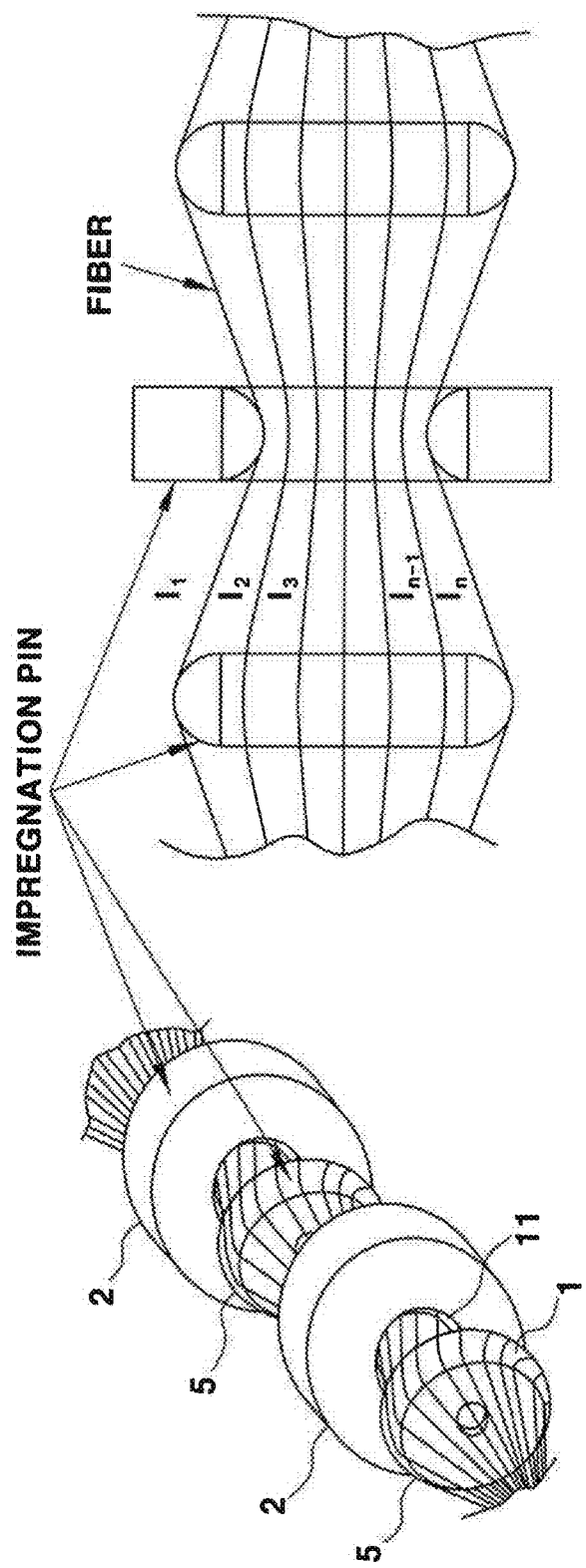
FIG. 2 is a schematic view illustrating an exemplary internal structure when a typical impregnation die may be used in the impregnation process of FIG. 1 according to an exemplary embodiment of the present invention.

In an exemplary embodiment of the present invention, the polypropylene resin composition may be applied to the carbon fiber reinforced polypropylene resin composite. Particularly, as shown in FIG. 1, the polypropylene resin composite may be prepared by subjecting the composition to an exemplary process for impregnating reinforcing fiber in the resin, which may be, but not limited to, a conventional process, such as molding process for a long-fiber reinforced thermoplastic resin. In an exemplary process, resin components may be fed through a twin-screw extruder; then reinforcing fiber such as carbon fiber may be fed from an impregnation die; and impregnation may be performed in the resin. After the impregnation is completed, the composite may be prepared through a take-off process, without limitation. In the preparation process, as seen in an exemplary internal structure of the impregnation die in FIG. 2, a composite with excellent dispersibility and mechanical properties may be prepared by spreading out several thousand to several ten thousand strands of carbon fiber while moving through impregnation pins, and penetrating the thermoplastic resin into the strands of fiber.

In general, the more the number of impregnation pins is, the more the fibers may spread, leading to an increase in impregnation property. However, since breakage of a single yarn of fiber may occur due to excessive tension applied to fiber, an optimal combination of pins, which may increase the degree of impregnation while damage to fiber is minimized, may be essential in the preparation of a thermoplastic carbon fiber composite. For example, when a composite is prepared using glass fiber, about 9 or 10 impregnation pins may be generally used, and in an exemplary embodiment of the present invention, continuous productivity may be enhanced when particularly about 7 or 8 pins are used to maintain an appropriate impregnation property while reducing tension applied to fiber.

In an exemplary embodiment of the present invention, a carbon fiber reinforced polypropylene resin composite may be prepared by a method including: adding an amount of about 1 to about 10 wt % of a modified polypropylene as a compatibilizer to an amount of about 50 to about 80 wt % of a polypropylene resin as a homopolymer of propylene or a propylene-ethylene copolymer, kneading and melting the resulting mixture at a temperature of about 220 to about 260° C. and at a rotation speed of about 250 to about 400 rpm, or particularly of about 280 to about 320 rpm by means of a twin-screw extruder, and impregnating an amount of about 15 to about 40 wt % of carbon fiber in the melt mixture at an impregnation die temperature of about 250 to about 320° C., or particularly of about 260 to about 280° C. Particularly, the polypropylene resin may have a melt index (MI) of about 20 to about 100 g/10 min at a temperature of about 230° C., a molecular weight distribution (MWD) of about 5 to about 10 and an isotactic index of about 97 to about 100. Further, the modified polypropylene may have a maleic anhydride graft ratio of about 0.5 to about 15 wt %. The composite obtained from an exemplary method may be a thermoplastic carbon fiber composite. Accordingly, a method for preparing the carbon fiber reinforced polypropylene resin composite is provided.

Figure 3:
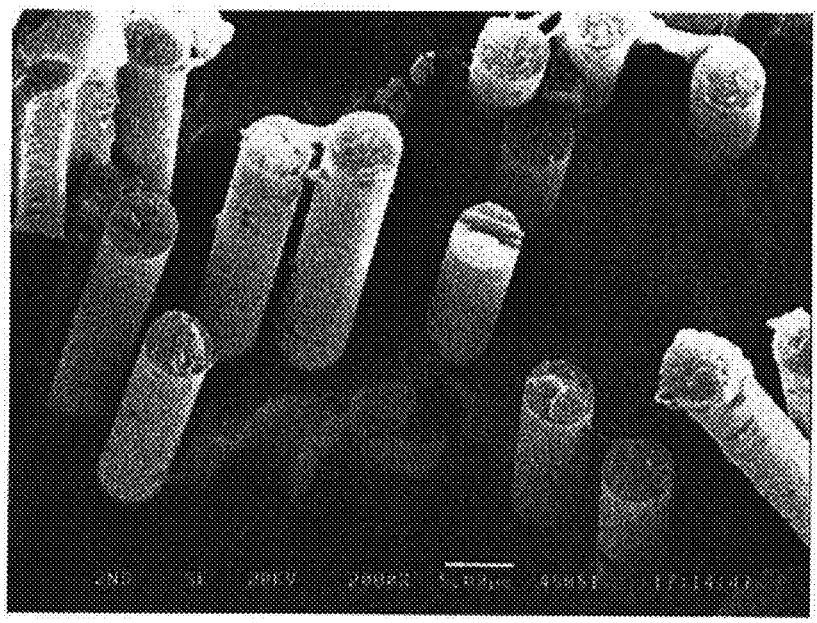
FIG. 3 shows microscopic views of a broken-out section of exemplary tensil samples of polypropylene resin composites.
Figure 3:
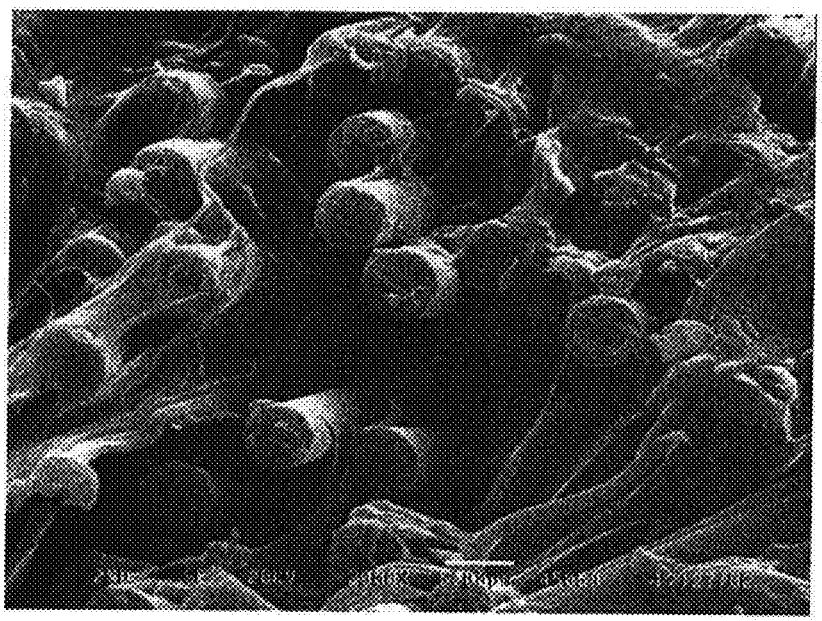

As described above, the impregnation property of carbon fiber and resin may be improved by preparing a carbon fiber reinforced polypropylene resin composite using the polypropylene resin composition according to various exemplary embodiments of the present invention, and a high-strength carbon fiber composite may be prepared by exemplary processes at low cost. In FIGS. 3 (a) and (b), a broken-out sections of exemplary tensile samples of Comparative Example 2 and Example 2 are observed by a scanning electron microscope. In FIG. 3 (a), holes through which carbon fibers are extruded from a polypropylene base material may be clearly observed in conventional composite. In contrast, in FIG. 3 (b), the composite according to an exemplary embodiment of the present invention has a structure in which the composite is well impregnated in the polypropylene resin base material while showing a state in which the perimeter of carbon fiber is surrounded by a compatibilizer. According to various examples of the present invention, an interfacial attraction between carbon fiber and the polypropylene base material may be maximized and optimal mechanical properties may be obtained in comparison to the configuration of the existing composite. In particular, the composite according to various exemplary embodiments of the present invention may enhance tensile strength by about two times or greater than the conventional composite, and may also have significantly improved flexural strength or elastic modulus.

Meanwhile, since a carbon fiber reinforced polypropylene resin composite with excellent physical properties may be prepared as described above by using the polypropylene resin composition according to various exemplary embodiments of the present invention, the resin composition may be applied to vehicle parts with high fluidity and excellent mechanical properties. Further, improved molding property and, simultaneously, improved strength and elastic modulus may be obtained by using the polypropylene and additionally using a modified polypropylene of which the molecular structure is controlled.

As described above, when applied to various industrial products, the resin composition of the present invention may have desired physical properties due to improved characteristics compared to the conventional resin composition.

In general, when molding is performed by using a polypropylene resin composition, a method of cutting molecular chains may be applied through the addition of peroxide during the extrusion process in order to increase fluidity of the resin in some cases. However, this method may degrade physical properties of a raw material resin entirely. Therefore, according to an exemplary embodiment of the present invention, by using the polypropylene with high fluidity and excellent physical properties and by increasing the molecular weight distribution in the polymerization reaction step of monomers, low-molecular weight polypropylene components may easily penetrate bundles of carbon fiber, thereby improving molding property when parts are molded.

In the related arts, carbon fiber is generally subjected to sizing treatment with a polar epoxy resin or urethane resin, and when carbon fiber is melt-extruded with a non-polar polypropylene, interfacial adhesion may not be sufficiently exhibited, thereby causing insufficient increase in tensile or flexural strength. However, according to an exemplary embodiment of the present invention, strength may be enhanced by a relatively small content of carbon fiber by using a polypropylene-based compatibilizer which may have a predetermined content of polar groups between a polar carbon fiber reinforcing agent and a non-polar polypropylene to significantly enhance affinity. Accordingly, reducing material costs may be obtained by using a small amount of expensive carbon fiber.

As described above, by using a small amount of a modified polypropylene grafted with a predetermined amount of maleic anhydride as a compatibilizer in a highly fluid and highly crystalline polypropylene resin having a specific physical property, carbon fibers may be impregnated in configuration having interfacial attraction with the polypropylene resin base material, thereby improving impregnation property. Accordingly, the polypropylene resin in various exemplary embodiments of the present invention may have improved strength and improved fluidity. Further, the polypropylene resin may easily penetrate bundles of carbon fiber when carbon fiber is impregnated, thereby providing additional enhanced physical properties due to enhancement of dispersibility. Moreover, when various industrial parts are molded through an extrusion or compression molding process using a composite in combination with the polypropylene resin composition according to various exemplary embodiments of the present invention, workability may be improved, cycle time may be reduced, and surface appearance quality may be significantly enhanced.

A composite may be prepared by using the carbon fiber reinforced polypropylene resin composition according to various embodiments of the present invention and may be applied to an industrial molded product, and particularly, parts for a vehicle may be molded and used. Accordingly, a molded product manufactured by performing molding with the carbon fiber reinforced polypropylene resin composition may be provided. In particular, parts for a vehicle may be manufactured. For example, interior and exterior materials such as a bumper beam, a front end module carrier, a door impact beam and a seat back, a chassis, car body parts and the like may be manufactured according to an exemplary embodiment of the present invention.

Hereinafter, the present invention will be described in detail with reference to the Examples, but the present invention is not limited thereto.

EXAMPLES

The following examples illustrate the invention and are not intended to limit the same.

Example 1

After resin components were fed through a twin-screw extruder, a reinforcing fiber such as carbon fiber may be fed from an impregnation die and impregnation was performed in the resin. After the impregnation, a resin composition may be prepared by using a process facility as illustrated in FIG. 1, in which a composite may be prepared through a take-off process. In this case, about 7 impregnation pins may be used in the impregnation die.

The components used in the preparation of the resin composition may be melt-kneaded at a temperature of about 240° C. and at a rotation speed of about 300 rpm by means of a twin-screw extruder by mixing about 67 wt % of PP-2 (polypropylene resin) having a melt index of about 15, a molecular weight distribution of about 4 and an isotactic index of about 96.4 with about 3 wt % of a compatibilizer-1 (CM1120H manufactured by Lotte Chemical Corporation, modified polypropylene) having a graft ratio of about 1%, and about 30 wt % of carbon fiber (CF-1, Grade name T700SC-24000-50C) may be impregnated at an impregnation die temperature of about 270° C. to obtain a carbon fiber reinforced polypropylene resin composition.

Examples 2 to 4

A carbon fiber reinforced polypropylene resin composition may be obtained by performing preparation in the same manner as in Example 1, and mixing, each independently, about 3 wt % of a compatibilizer-2 (PH200 manufactured by Lotte Chemical Corporation), a compatibilizer-3 (0555A manufactured by Mitsui Chemical Hi-Wax) and a compatibilizer-4 (GenPoly GMP7550N manufactured by Lotte Chemical Corporation) having a graft ratio of about 5%, about 9% and about 11%, respectively.

Examples 5 to 6

A carbon fiber reinforced propylene resin composition may be obtained by performing preparation in the same manner as in Example 1, using about 65 wt % of PP-2, and mixing, each independently, about 5 wt % of the compatibilizer-1 and the compatibilizer-2.

Comparative Example 1

A carbon fiber reinforced polypropylene resin composition may be obtained by performing preparation in the same manner as in Example 1, and using about 70 wt % of PP-1 having a melt index of about 60, a molecular weight distribution of about 7 and an isotactic index of about 98.8 without using a compatibilizer.

Comparative Example 2

A carbon fiber reinforced polypropylene resin composition may be obtained by performing preparation in the same manner as in Example 1, and using about 70 wt % of PP-2 without using a compatibilizer.

Comparative Examples 3 and 4

A carbon fiber reinforced polypropylene resin composition may be obtained by performing preparation in the same manner as in Example 1, using about 70 wt % of PP-2, and using, each independently, about 30 wt % of carbon fiber (CF-2, Grade name T700SC-24000-60E) manufactured by Toray Industries, Inc. and a carbon fiber (CF-3, Grade name T700SC-24000-F0E) manufactured by Toray Industries, Inc. as carbon fibers without using a compatibilizer.

TABLE 1

| Classification | Polypropylene Resin (wt %) | | Carbon Fiber (wt %) | | | Modified Polypropylene (wt %) | | | |
|---|---|---|---|---|---|---|---|---|---|
| | PP-1 | PP-2 | CF-1 | CF-2 | CF-3 | Compatibilizer-1 | Compatibilizer-2 | Compatibilizer-3 | Compatibilizer-4 |
| Example 1 | — | 67 | 30 | — | — | 3 | — | — | — |
| Example 2 | — | 67 | 30 | — | — | — | 3 | — | — |
| Example 3 | — | 67 | 30 | — | — | — | — | 3 | — |
| Example 4 | — | 67 | 30 | — | — | — | — | — | 3 |
| Example 5 | — | 65 | 30 | — | — | 5 | — | — | — |
| Example 6 | — | 65 | 30 | — | — | — | 5 | — | — |
| Comparative Example 1 | 70 | — | 30 | — | — | — | — | — | — |
| Comparative Example 2 | — | 70 | 30 | — | — | — | — | — | — |
| Comparative Example 3 | — | 70 | — | 30 | — | — | — | — | — |
| Comparative Example 4 | — | 70 | — | — | 30 | — | — | — | — |
| Comparative Example 5 | — | 67 | 30 | — | — | — | 3 | — | — |

In each of Examples 1 to 6 and Comparative Examples 1 to 4, tensile strength, flexural strength, flexural modulus and spiral flow were measured, and the results are shown in Table 2.

TABLE 2

| Classification | Tensile strength (Mpa)*1) | Flexural strength (Mpa)*2) | Flexural modulus (MPa)*2) | Spiral flow (mm)*3) |
|---|---|---|---|---|
| Comparative Example 1 | 28 | 67 | 12.05 | 63 |
| Comparative Example 2 | 60 | 105 | 14,800 | 75 |
| Comparative Example 3 | 55 | 99 | 14,000 | 74 |
| Comparative Example 4 | 52 | 94 | 13,500 | 74 |
| Comparative Example 5 | 88 | 108 | 15,100 | 76 |
| Example 1 | 95 | 123 | 15,700 | 77 |
| Example 2 | 155 | 184 | 15,700 | 79 |
| Example 3 | 130 | 145 | 16,300 | 78 |
| Example 4 | 136 | 172 | 17,000 | 78 |
| Example 5 | 103 | 112 | 15,300 | 78 |
| Example 6 | 140 | 190 | 15,400 | 80 |

The experimental methods in Table 2 are as follows.
*1)Tensile Strength: standard ASTM D638
*2)Flexural strength and flexural modulus: standard ASTM D790
*3)Spiral flow: standard ASTM D 3123 (Injection pressure 100 kg/cm$^2$, Injection temperature 250° C., and Spiral mold width 3 mm)

As results, the Examples according to exemplary embodiments of the present invention may have enhanced physical properties, which are approximately two times or greater in tensile strength and flexural strength than the Comparative Examples.

Experimental Example 2

In order to confirm structural characteristics of the polypropylene resin compositions prepared in Example 2 and Comparative Example 2, broken-out sections of tensile samples of Comparative Example 2 and Example 2 were captured by a scanning electron microscope (SEM), and comparative photographs are shown in FIG. 3.

As a result of comparing photos of FIG. 3, Example 2 in FIG. 3 (b) showed a structure in which the perimeter of carbon fiber was surrounded by the compatibilizer and carbon fiber was well impregnated in the polypropylene resin base material, whereas in Comparative Example 2 in FIG. 3 (a), holes through which carbon fiber was extruded from the polypropylene resin base material were clearly observed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene resin composition, comprising:
   an amount of about 50 to about 80 wt % of a polypropylene resin as a homopolymer of propylene or a propylene-ethylene copolymer;
   an amount of about 1 to about 10 wt % of a modified polypropylene as a compatibilizer; and
   an amount of about 15 to about 40 wt % of carbon fiber, based on the total weight of the polypropylene resin composition,
   wherein the polypropylene resin has a melt index (MI) of about 20 to about 100 g/10 min at a temperature of about 230° C., a molecular weight distribution (MWD) of about 5 to about 10 and an isotactic index of about 97 to about 100, and
   wherein the modified polypropylene has a maleic anhydride graft ratio of about 5 to 11 wt %.

2. The polypropylene resin composition of claim 1, wherein the polypropylene resin composition includes an amount of about 60 to about 70 wt % of the polypropylene resin, an amount of about 2 to about 7 wt % of the modified polypropylene, and an amount of about 25 to about 35 wt % of the carbon fiber, based on the total weight of the polypropylene resin composition.

3. A carbon fiber reinforced polypropylene resin composite prepared by impregnating an amount of about 15 to about 40 wt % of carbon fiber in a melt mixture including an amount about 50 to about 80 wt % of a polypropylene resin as a homopolymer of propylene or a propylene-ethylene copolymer and an amount of about 1 to about 10 wt % of modified polypropylene as a compatibilizer,
   wherein the polypropylene resin has a melt index (MI) of about 20 to about 100 g/10 min at a temperature of about 230° C., a molecular weight distribution (MWD) of about 5 to about 10 and an isotactic index of about 97 to about 100, and
   wherein the modified polypropylene has a maleic anhydride graft ratio of about 5 to 11 wt %.

4. A method for preparing a carbon fiber reinforced polypropylene resin composite, comprising:
   adding an amount of about 1 to about 10 wt % of a modified polypropylene as a compatibilizer to an amount of about 50 to about 80 wt % of a polypropylene resin as a homopolymer of propylene or a propylene-ethylene copolymer;
   kneading and melting the resulting mixture at a temperature of about 220 to about 260° C. and at a rotation speed of about 250 to about 400 rpm by means of a twin-screw extruder; and
   impregnating an amount of about 15 to about 40 wt % of carbon fiber in the melt mixture at an impregnation die temperature of about 250 to about 320° C.,
   wherein the polypropylene resin has a melt index (MI) about 20 to about 100 g/10 min at a temperature of about 230° C., a molecular weight distribution (MWD) of about 5 to about 10 and an isotactic index of about 97 to about 100, and
   wherein the modified polypropylene has a maleic anhydride graft ratio of 5 to 11 wt %.

5. The method of claim 4, wherein in said impregnating, about 7 or 8 impregnation pins are used.

6. A molded product obtained by steps comprising molding with the polypropylene resin composition of claim 1.

7. The molded product of claim 6, wherein the molded product is a part for a vehicle.

8. The molded product of claim 7, wherein the molded product is a vehicle bumper.

* * * * *